(12) United States Patent
Judson et al.

(10) Patent No.: US 8,941,839 B2
(45) Date of Patent: Jan. 27, 2015

(54) RATE SENSITIVE BLANKING OF A PATH LENGTH CONTROL CIRCUIT IN A GYROSCOPE

(75) Inventors: Francis J. Judson, Morristown, NJ (US); Alan Bruce Touchberry, Morristown, NJ (US); Stephen M. Baker, Morristown, NJ (US); Craig A. Galbrecht, Morristown, NJ (US)

(73) Assignee: Honeywell International Inc., Morristown, NJ (US)

( * ) Notice: Subject to any disclaimer, the term of this patent is extended or adjusted under 35 U.S.C. 154(b) by 642 days.

(21) Appl. No.: 13/250,523

(22) Filed: Sep. 30, 2011

(65) Prior Publication Data

US 2013/0083329 A1    Apr. 4, 2013

(51) Int. Cl.
  *G01C 19/68*    (2006.01)
  *G01C 19/66*    (2006.01)
(52) U.S. Cl.
  CPC .................... *G01C 19/665* (2013.01)
  USPC ........................................................ 356/474
(58) Field of Classification Search
  CPC .... G01C 19/664; G01C 19/662; G01C 19/68; G01C 19/665
  USPC ........................ 356/459–476, 483
  See application file for complete search history.

(56) References Cited

U.S. PATENT DOCUMENTS

| | | | |
|---|---|---|---|
| 5,048,963 | A | 9/1991 | Ignagni |
| 5,402,232 | A | 3/1995 | Albers et al. |
| 6,354,964 | B1 | 3/2002 | Galbrecht et al. |
| 7,330,269 | B2 | 2/2008 | Zurn et al. |
| 7,916,302 | B2 | 3/2011 | Fellows et al. |
| 2006/0290940 | A1 | 12/2006 | Beaudet et al. |

OTHER PUBLICATIONS

European Patent Office, "European Search Report from EP Application No. 12185985.4 mailed Mar. 20, 2014", "from Foreign Counterpart of U.S. Appl. No. 13/250,523", Mar. 20, 2014, pp. 1-3, Published in: EP.

European Patent Office, Office Action from EP Application No. 12185985.4 mailed Apr. 8, 2014, from Foreign Counterpart of U.S. Appl. No. 13/250,523, Apr. 8, 2014, pp. 1-7, Published in: EP.

*Primary Examiner* — Hwa Lee
(74) *Attorney, Agent, or Firm* — Fogg & Powers LLC

(57) ABSTRACT

A method and system for rate sensitive blanking in a path length control circuit of a gyroscope is provided. The method comprises determining an angular rate of the gyroscope, detecting a zero rate of the gyroscope where one or more single beam signals occur, and determining one or more blanker positions based on the zero rate. A blanker pulse is generated at the blanker positions such that the path length control circuit suspends operation when the one or more single beam signals occur.

19 Claims, 18 Drawing Sheets

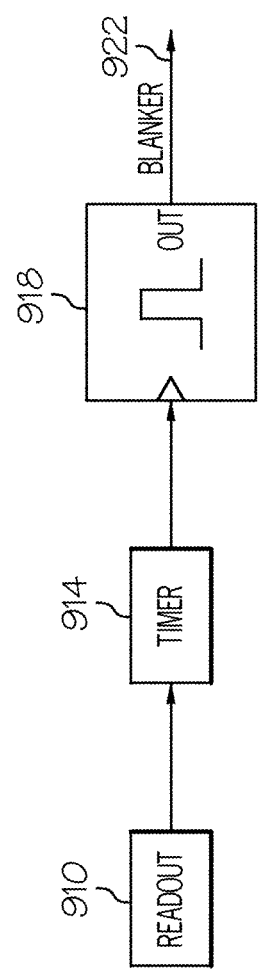

RATE SENSITIVE BLANKING OF A PATH LENGTH CONTROL CIRCUIT IN A GYROSCOPE

BACKGROUND

In a dithered Ring Laser Gyroscope (RLG) a small fluctuation, referred to as a single beam signal (SBS), will appear on a laser intensity monitor (LIM) observing either the clockwise (CW) or counter-clockwise (CCW) beams. This fluctuation appears at the "zero rate" of the RLG. As this fluctuation may upset the Path Length Control (PLC) subsystem of the RLG it is desirable to take the PLC subsystem offline during these disturbances.

In prior approaches, hardware circuits are used to synchronize to the dither motion and create a blanking pulse that suspends operation of the PLC circuitry during the SBS event. The blanking pulses are timed to occur at the peaks (presumably zero rate) of the dither angle (DPO). For low rates of inertial motion this method is adequate. However, for higher rates of several degrees per second or more, the effective position of the zero rate changes relative to the dither angle. This renders a statically positioned system inadequate as the blanking pulse will occur at the wrong time.

SUMMARY

A method and system for rate sensitive blanking in a path length control circuit of a gyroscope is provided. The method comprises determining an angular rate of the gyroscope, detecting a zero rate of the gyroscope where one or more single beam signals occur, and determining one or more blanker positions based on the zero rate. A blanker pulse is generated at the blanker positions such that the path length control circuit suspends operation when the one or more single beam signals occur.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which:

FIG. 9 is a block diagram illustrating a digital system for monitoring RLG counts according to one embodiment that is utilized for rate sensitive blanking;

DETAILED DESCRIPTION

In the following detailed description, reference is made to the accompanying drawings in which is shown by way of example specific illustrative embodiments. It is to be understood that other embodiments may be utilized and that mechanical and electrical changes may be made. The following detailed description is, therefore, not to be taken in a limiting sense.

A method and system are provided for rate sensitive blanking of a path length control circuit in a Ring Laser Gyroscope (RLG). In one approach, sensor measurements from the RLG are used to determine an inertial rate. The correct blanker position is predicted using inertial rate, dither amplitude, and dither frequency.

In the present method, an active measurement of rate is employed to correctly position the blanking pulse when exposed to all input rates. This maintains the integrity of the Path Length Control (PLC) subsystem.

The present approach can be implemented in software and/or hardware as desired for a given application, which has access to the specified input data and the necessary computational resources. Further details of the present method and system are described hereafter with respect to the drawings.

Figure 1:
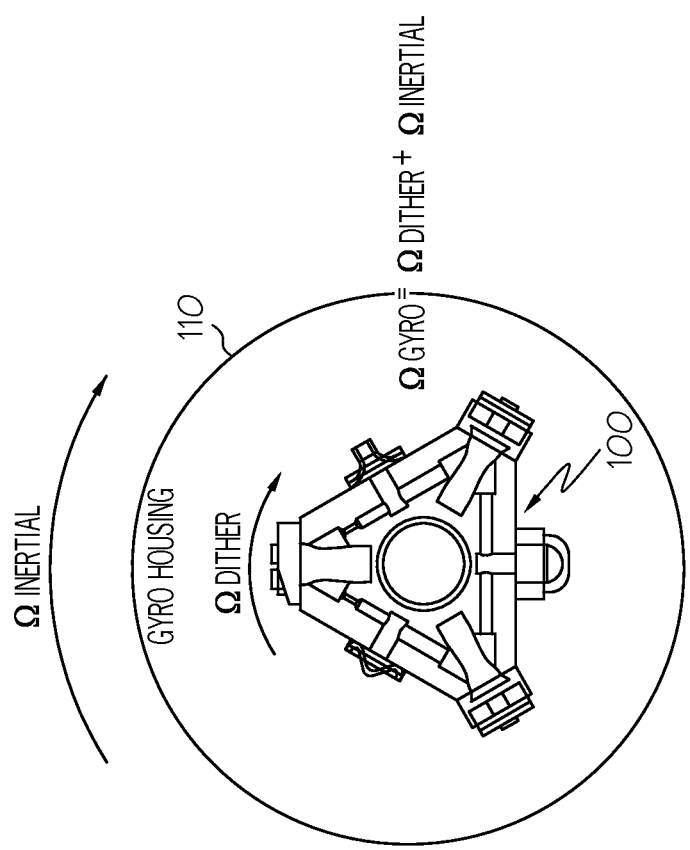
FIG. 1 is a schematic diagram of a ring laser gyroscope (RLG) according to one embodiment in which rate sensitive blanking can be implemented.

FIG. 1 is schematic diagram of an RLG 100 according to one embodiment in which the present technique can be implemented. As shown in FIG. 1, RLG 100 has an inertial rate ($\Omega_{Inertial}$) outside of a housing 110 and a dither rate ($\Omega_{Dither}$) within housing 110. The RLG 100 senses the sum of the inertial rate and the dither rate. Thus, the gyro rate ($\Omega_{Gyro}$) is equal to the dither rate plus the inertial rate. During low rate (or zero rate) events, the RLG experiences fluctuations in its laser intensity. These fluctuations, known as Single Beam Signal (SBS), can perturb the path length control circuitry of the RLG and degrade gyro performance.

Figure 2:
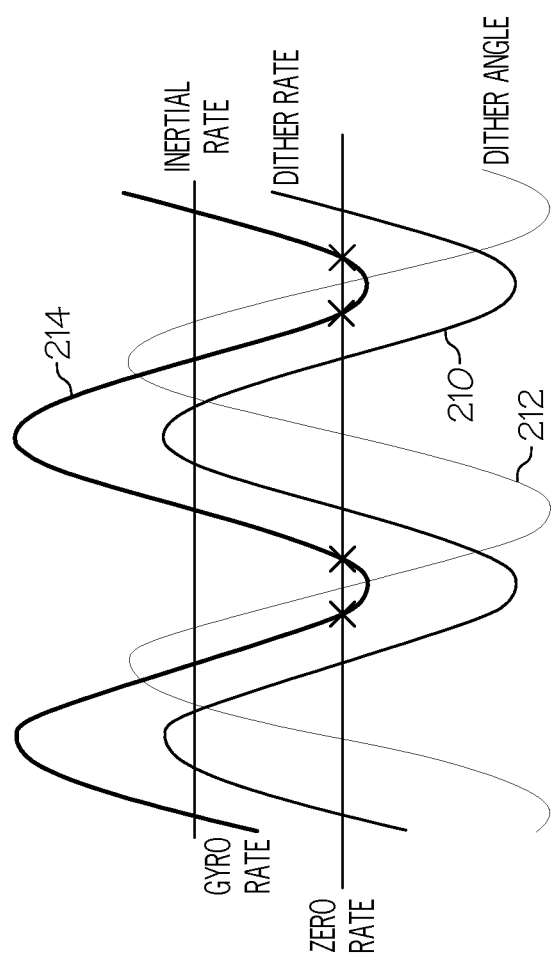
FIG. 2 is a graphical illustration of the phase relationship of various signals utilized in rate sensitive blanking.

FIG. 2 is a graphical illustration of the phase relationship of various signals utilized in the present approach. A dither rate signal 210 and a dither angle signal 212 are both sine waves that are 90 degrees out of phase with each other. A gyro rate signal 214 is in phase with the dither rate signal 210 (for constant inertial rate).

The dither rate is the derivative of the dither angle. A blanking pulse is needed when the gyro rate is zero, and not when the dither rate is zero. When inertial rates are significant, the position of the zero gyro rate is shifted relative to dither angle (DPO) peak. The present rate sensitive blanking technique accommodates for this shift so that blanking occurs at the correct time as inertial rates change. This technique can be implemented in various approaches.

Blanking Time Prediction

In one approach, gyro sensor measurements are processed to determine an inertial rate. A correct blanking time and position are then predicted using the inertial rate, dither amplitude, and dither frequency. An apparatus is then employed to utilize this information by synchronizing blanking activity to the DPO signal.

Since the RLG observes total rate (inertial rate plus dither rate), the dither rate needs to be removed to determine the inertial rate. This may be performed with several techniques. One such technique for removing dither rate is dither compensation, as the rate accuracy requirements for this technique are not stringent.

In the dither compensation technique, a total angle $\theta$ is sampled at identical phase points of the dither signal, which is the angle at positive zero crossing ($\theta_{PZC}$). The displacement due to dither in the first differences ($\Delta\theta_{Inertial} = \theta_{PZC}(i) - \theta_{PZC}(i-1)$) is negligible. What is left over, $\Delta\theta_{Inertial}$, is inertial displacement per dither cycle, which is a measure of inertial rate.

Figure 3:
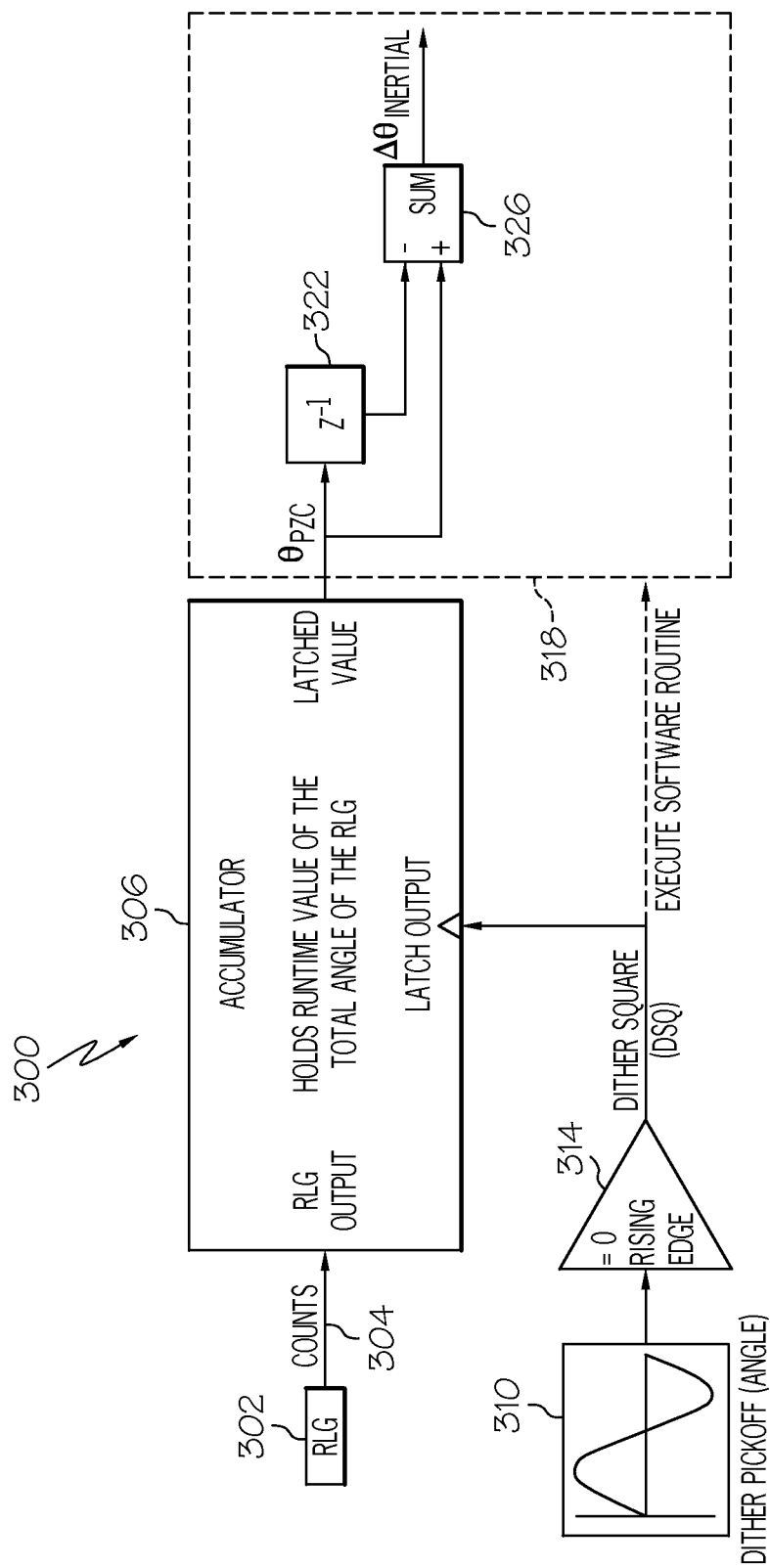
FIG. 3 is a block diagram of a dither compensation technique according to one embodiment utilized in rate sensitive blanking.

FIG. 3 is a block diagram illustrating a dither compensation technique 300. An RLG 302 outputs a readout counts signal 304 to an accumulator 306, which holds the runtime value of the total angle of the RLG. A dither pickoff signal 310 is fed into a comparator 314 to detect the positive zero crossing (PZC). The resultant dither square signal (DSQ) is used to latch the accumulator 306. A software routine is then executed at 318, which utilizes $\theta_{PZC}$ from accumulator 306, which is processed at delay block 322. The output from delay block 322 is received by an adder 326, which also receives $\theta_{PZC}$. The output from adder 326 is $\Delta\theta_{Inertial}$.

The inertial rate can be calculated from $\Delta\theta_{Inertial}$ as follows:

$$\Delta\theta_{Inertial} = Rate_{Inertial} * Period_{Dither}$$

$$\Delta\theta_{Inertial} = \frac{Rate_{Inertial}}{f_{Dither}} = \left(\frac{2\pi}{\omega_{Dither}}\right) Rate_{Inertial}$$

$$Rate_{Inertial} = \frac{\Delta\theta_{Inertial} * \omega_{Dither}}{2\pi}$$

where $f_{Dither}$ and $\omega_{Dither}$ are representations of the dither frequency. The blanker position can be predicted using the following equations:

$$Rate_{Inertial} = -Rate_{Dither}$$

$$\frac{\Delta\theta_{Inertial} * \omega_{Dither}}{2\pi} = -A\omega_{Dither}\cos(\omega_{Dither}t_{Blank})$$

$$\frac{\Delta\theta_{Inertial}}{2\pi} = -A\cos(\omega_{Dither}t_{Blank})$$

$$t_{Blank} = \frac{\cos^{-1}\left(\frac{-\Delta\theta_{Inertial}}{2\pi * A}\right)}{\omega_{Dither}}$$

where A is the dither angle peak amplitude, and $t_{Blank}$ is the time at which to blank relative to the rising edge of dither square ($t_{PZC}$).

Figure 4:
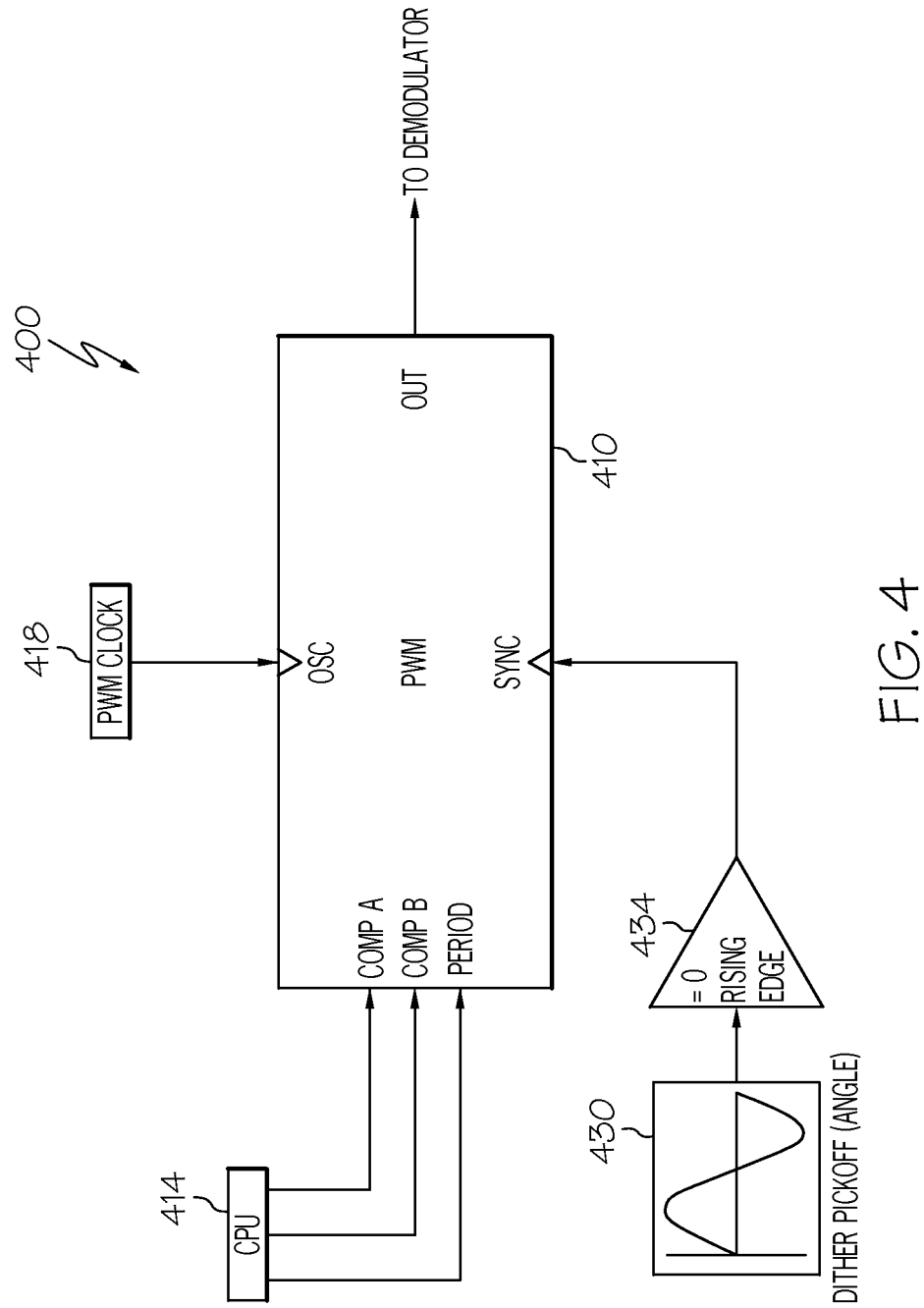
FIG. 4 is a block diagram of an apparatus for performing rate sensitive blanking according to one embodiment.

Once the inertial rate is determined, an apparatus is employed to synchronize the inertial rate to the DPO signal. This produces the blanking pulses at predicted times. FIG. 4 is a block diagram of an exemplary apparatus 400 according to one embodiment. The apparatus 400 includes a pulse width modulator (PWM) 410 that has dual compare registers (CompA and CompB) with independent action on up/down counting, and a period register. A processor 414, such as a central processing unit (CPU), is operatively coupled to the dual compare registers and period register. A PWM clock 418 such as an 8 MHz oscillator is also coupled to PWM 410. A counter in PWM 410 is resynchronized by a dither pickoff signal 430 that is fed into a comparator 434 coupled to PWM 410. The output of PWM 410 is then transmitted to a demodulator to pause its operation.

Figure 5:
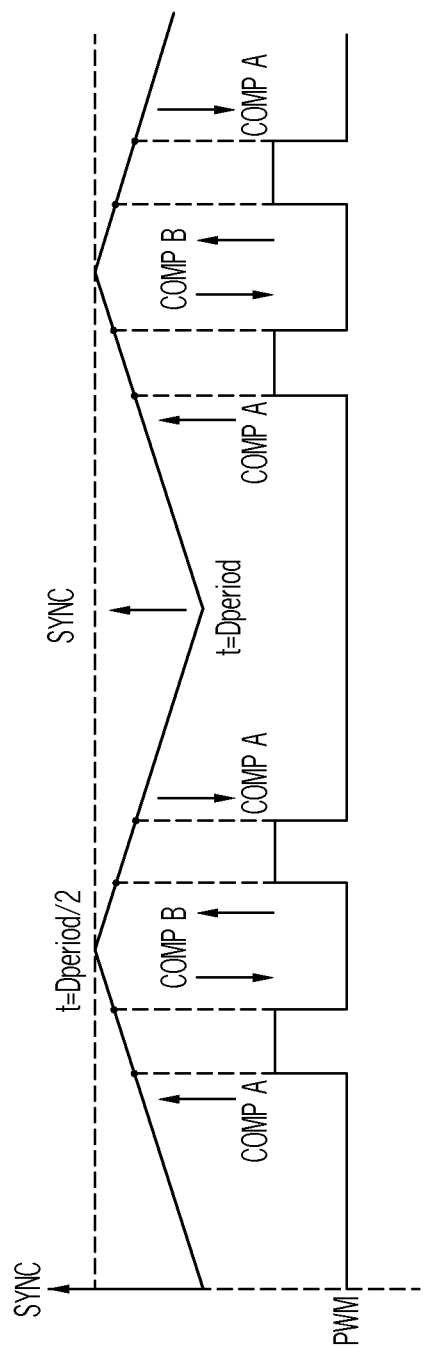
FIG. 5 is a timing diagram for pulse width modulation used in the apparatus of FIG. 4.

FIG. 5 is a timing diagram for pulse width modulation used in apparatus 400. The sync signal enforces a reset of PWM direction and value. After a sync event the PWM counts up from zero. When the PWM has counted up to the CompA value (start of $1^{st}$ blanking event) preprogrammed by the CPU, it asserts its output. When the PWM has counted up to the CompB value (end of $1^{st}$ blanking event) preprogrammed by the CPU, it de-asserts its output. When the PWM has counted up to Dither(D)Period/2 it begins to count down. When the PWM has counted down to the CompB value (start of $2^{nd}$ blanking event) preprogrammed by the CPU, it asserts its output. When the PWM has counted down to the CompA value (end of $2^{nd}$ blanking event) preprogrammed by the CPU, it de-asserts its output. If the PWM counts down to 0 before the next sync, it will begin to count up. Regardless, the next sync will reset both value and direction. Proper system design ensures that these resynchronizations have only minimal effect. The rising edge of dither square ($t_{PZC}$) is used as a reference for the "zero rate" positions ($t_{Blank}$) for the blanking signal.

Rate Comparison

In another approach to rate sensitive blanking, gyro sensor measurements are processed to determine an inertial rate such as described above. Once the inertial rate is determined, a signal is produced for use by an analog comparator to activate a blanker pulse. Alternatively, a dither rate signal can be sampled and used by a digital comparator to activate a blanker pulse.

Figure 6:
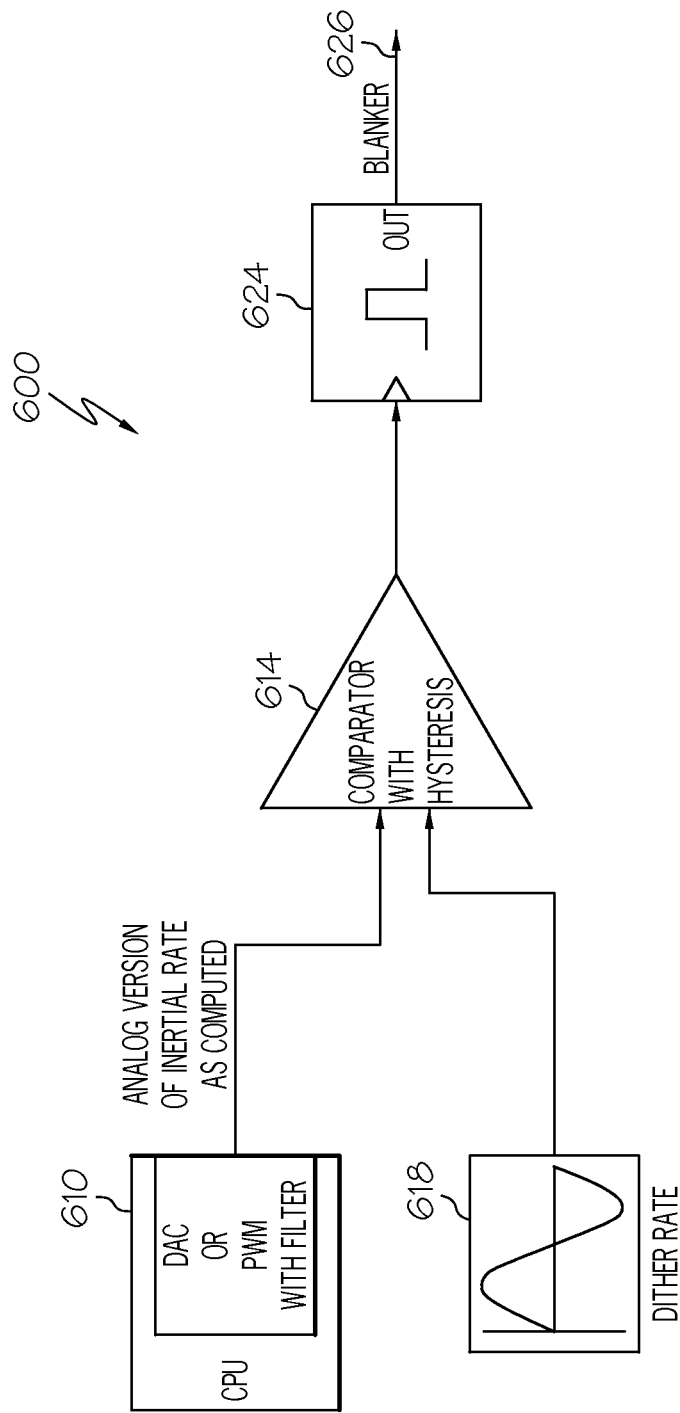
FIG. 6 is a block diagram illustrating an analog system for rate comparison according to one embodiment that is utilized for rate sensitive blanking.

FIG. 6 is a block diagram illustrating an analog system 600 for rate comparison. An analog version of the RLG inertial rate is computed by a processor 610, such as a CPU with a digital-to-analog converter (DAC) or a PWM with filter. The inertial rate is sent to an analog comparator 614 with hysteresis. An RLG dither rate signal 618 is also sent to comparator 614. The output of comparator 614 is coupled to an input of a one-shot circuit 624. The comparator 614 outputs an analog output voltage at a value representing the computed inertial rate. This triggers one-shot circuit 624 to activate a blanker pulse 626.

Figure 7:
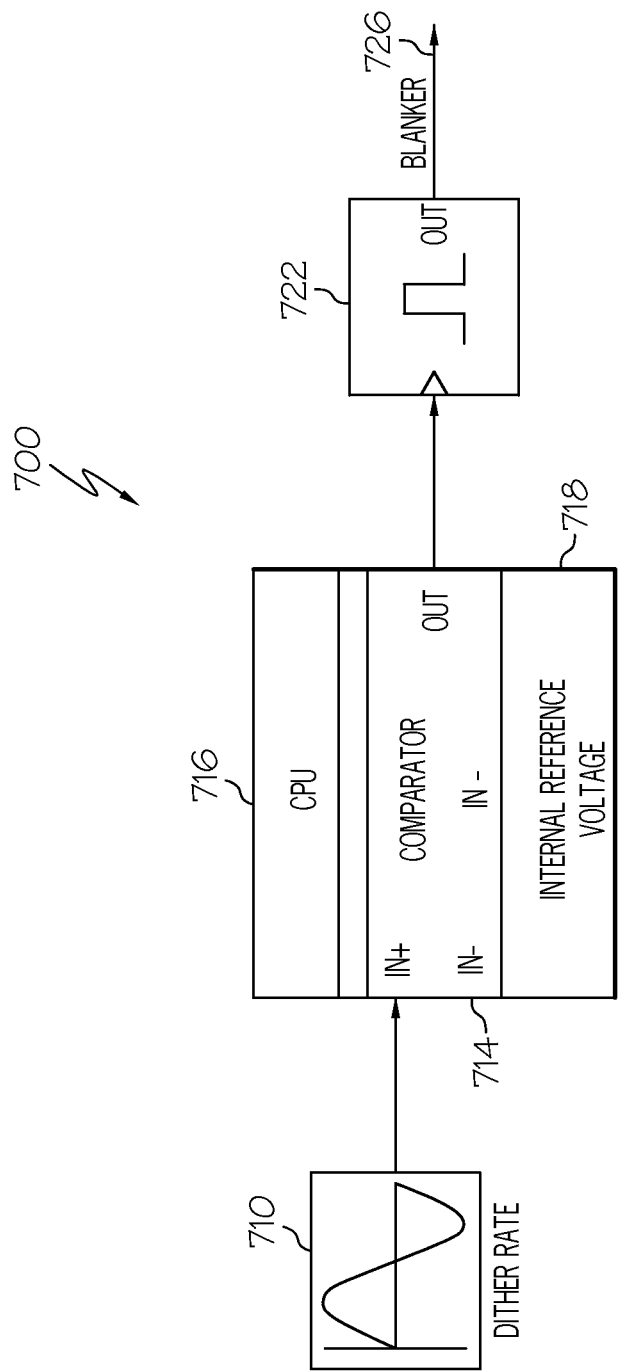
FIG. 7 is a block diagram illustrating a digital system for rate comparison according to one embodiment that is utilized for rate sensitive blanking.

FIG. 7 is a block diagram illustrating a digital system 700 for rate comparison. A dither rate signal 710 is sent to an input of a digital comparator 714 coupled to a processor 716. An internal reference voltage is maintained at a value representing the computed inertial rate at 718. The output from comparator 714 is coupled to an input of a one-shot circuit 722. The dither rate signal 710 is compared to the reference voltage, and the output from comparator 714 triggers one-shot circuit 722 to activate a blanker pulse 726.

Monitoring RLG Counts

In a further approach to rate sensitive blanking, RLG counts are monitored and blanking is applied as the frequency of the counts slow. This approach can be implemented in either analog or digital systems. This method distinguishes itself from previously discussed methods in that no computation of rate is required in its implementation.

Figure 8:
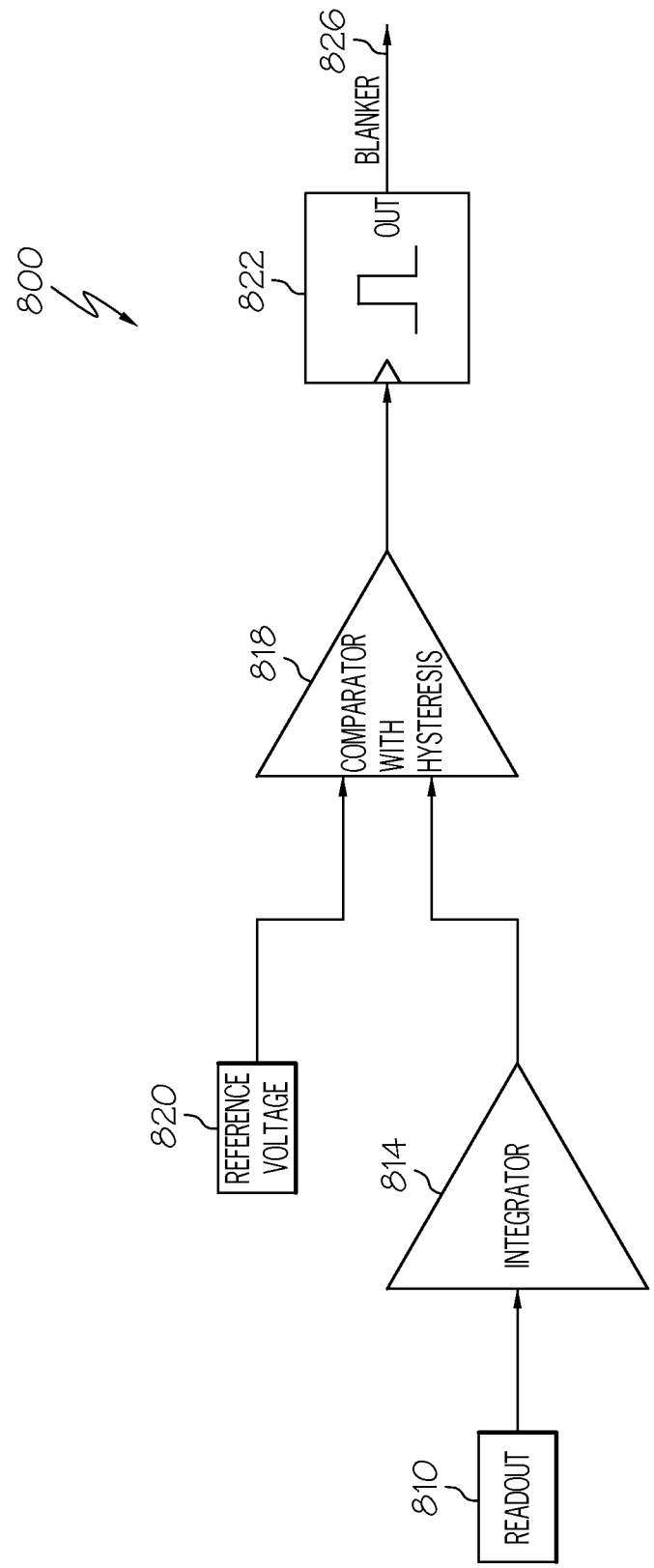
FIG. 8 is a block diagram illustrating an analog system for monitoring RLG counts according to one embodiment that is utilized for rate sensitive blanking.

FIG. 8 is a block diagram illustrating an analog system 800 for monitoring RLG counts. An RLG readout signal 810 is coupled to an input of integrator 814, which is reset for every rising edge of the readout signal. The output of integrator 814 is coupled to an input of analog comparator 818 with hysteresis. A reference voltage 820 is also coupled to the input of comparator 818. The output of comparator 818 is coupled to an input of a one-shot circuit 822. When integrator 814 ramps above a comparator threshold (for large readout pulse near zero gyro rate), comparator 818 triggers one-shot circuit 822 to activate a blanker pulse 826.

FIG. 9 is a block diagram illustrating a digital system 900 for monitoring RLG counts. An RLG readout signal 910 is coupled to a reset on a timer 914, and timer 914 is connected to an input of a one-shot circuit 918. When timer 914 times out (for wide readout pulses near zero gyro rate), one-shot circuit 918 is triggered to activate a blanker pulse 922.

FIGS. 10A-10G are graphical representations of SBS and blanking behavior at differing inertial input rates (shown as negative of input rate). The signals depicted in FIGS. 10A-10G include a laser intensity monitor (LIM) signal 1002 with SBS components 1004, an angular position signal 1006, an angular rate signal 1008, and a blanker pulse 1010.

Figure 10A:
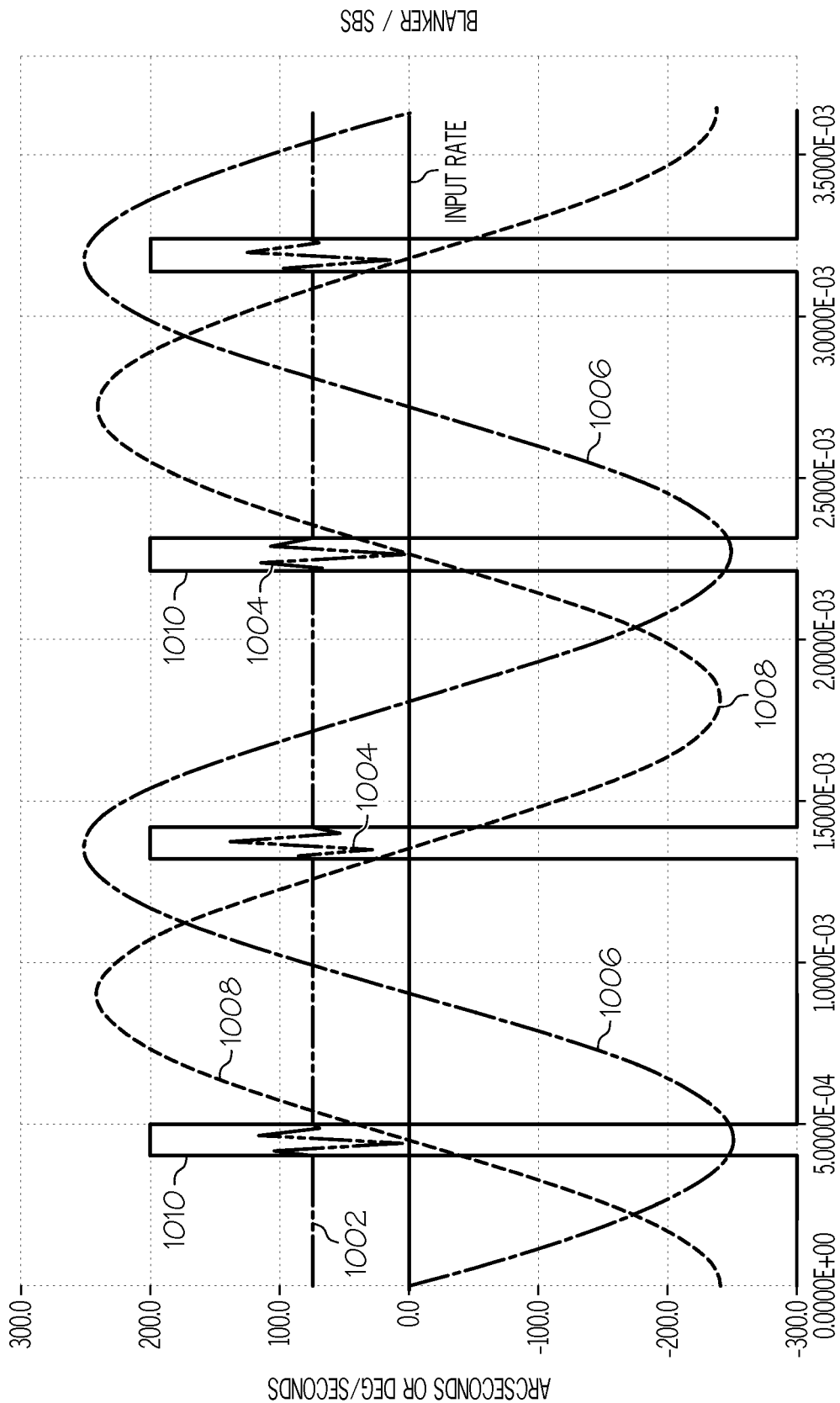
FIGS. 10A-10G are graphical representations of single beam signal and blanking behavior at differing inertial rates during rate sensitive blanking.
Figure 10B:
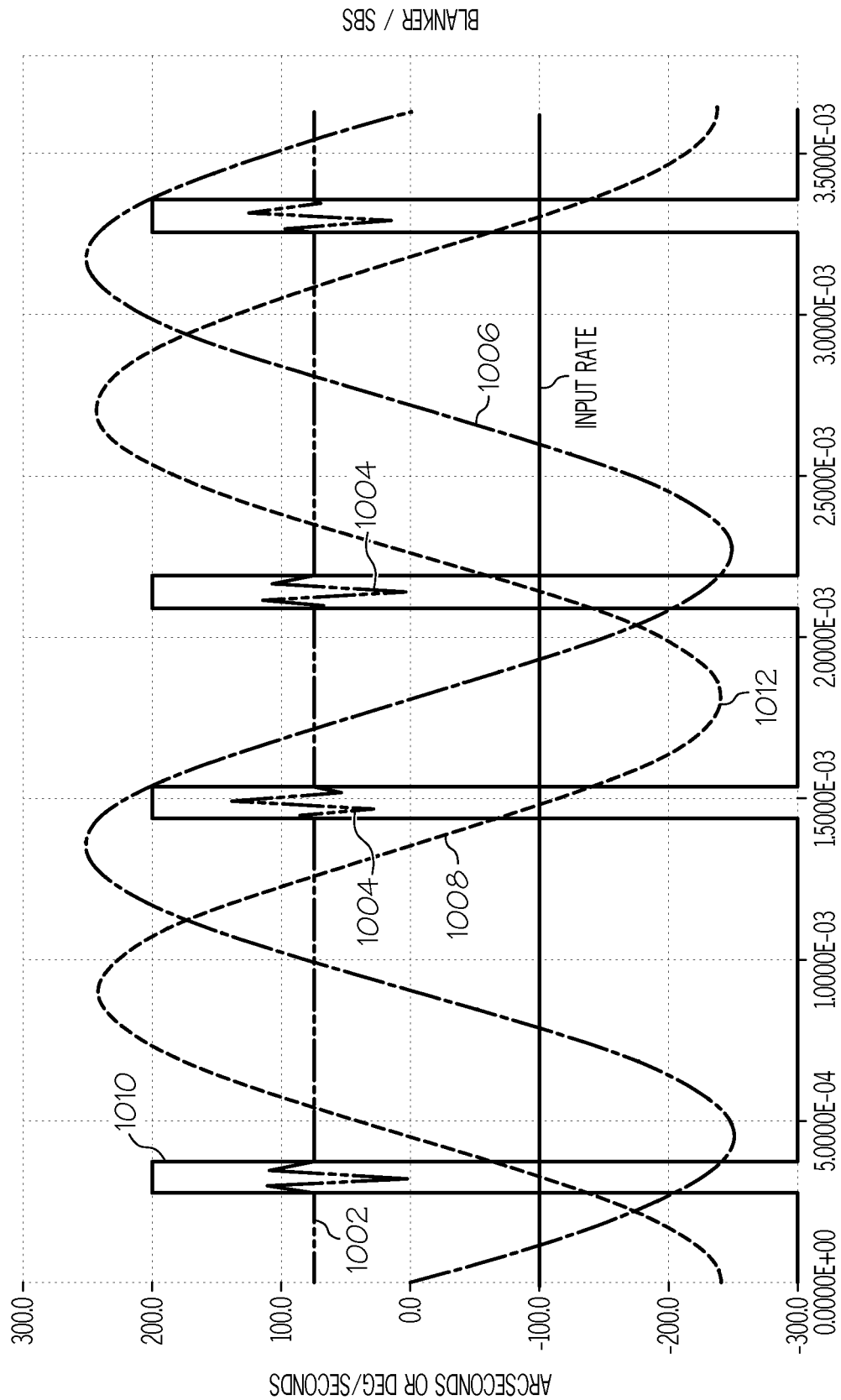
Figure 10C:
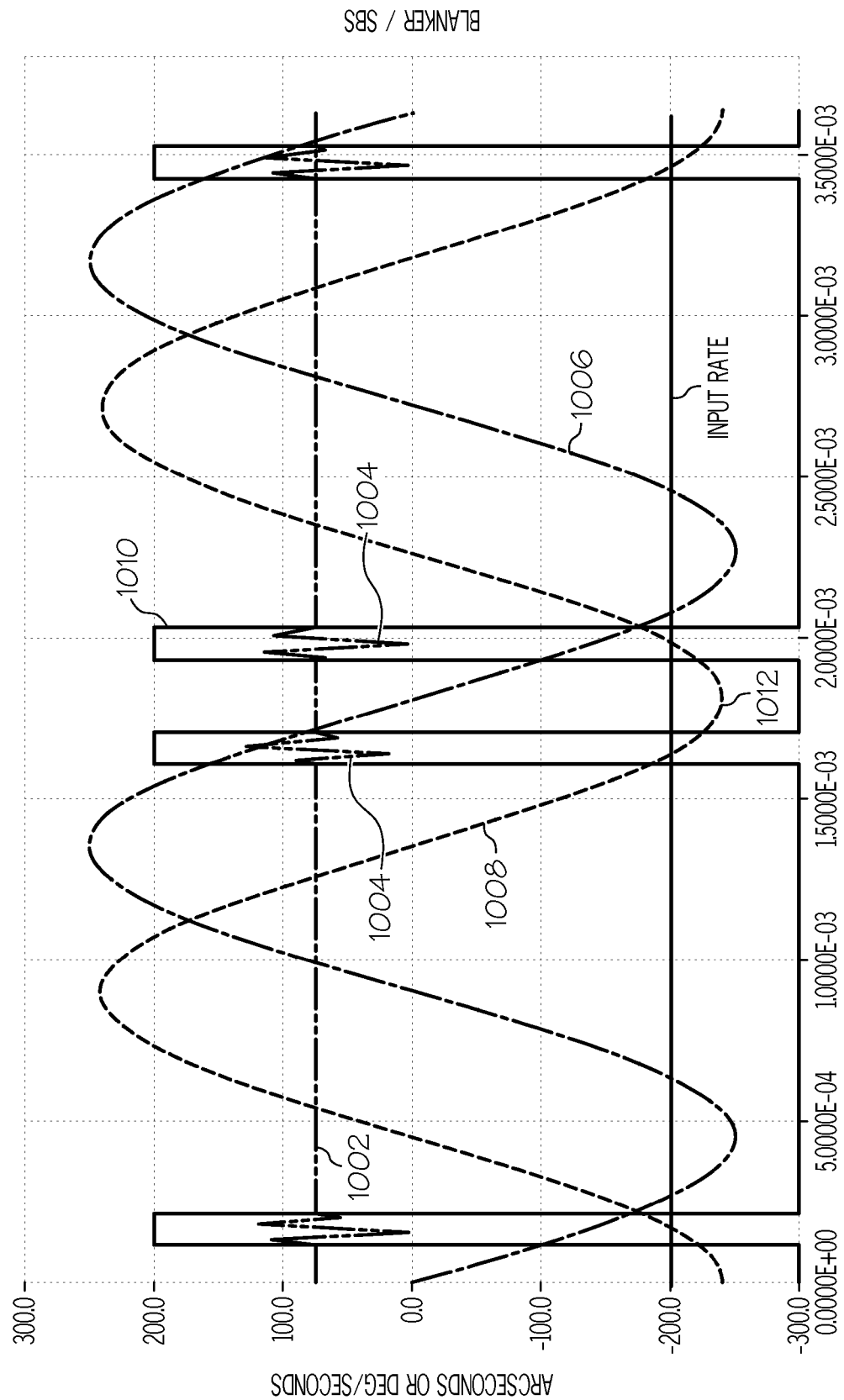
Figure 10D:
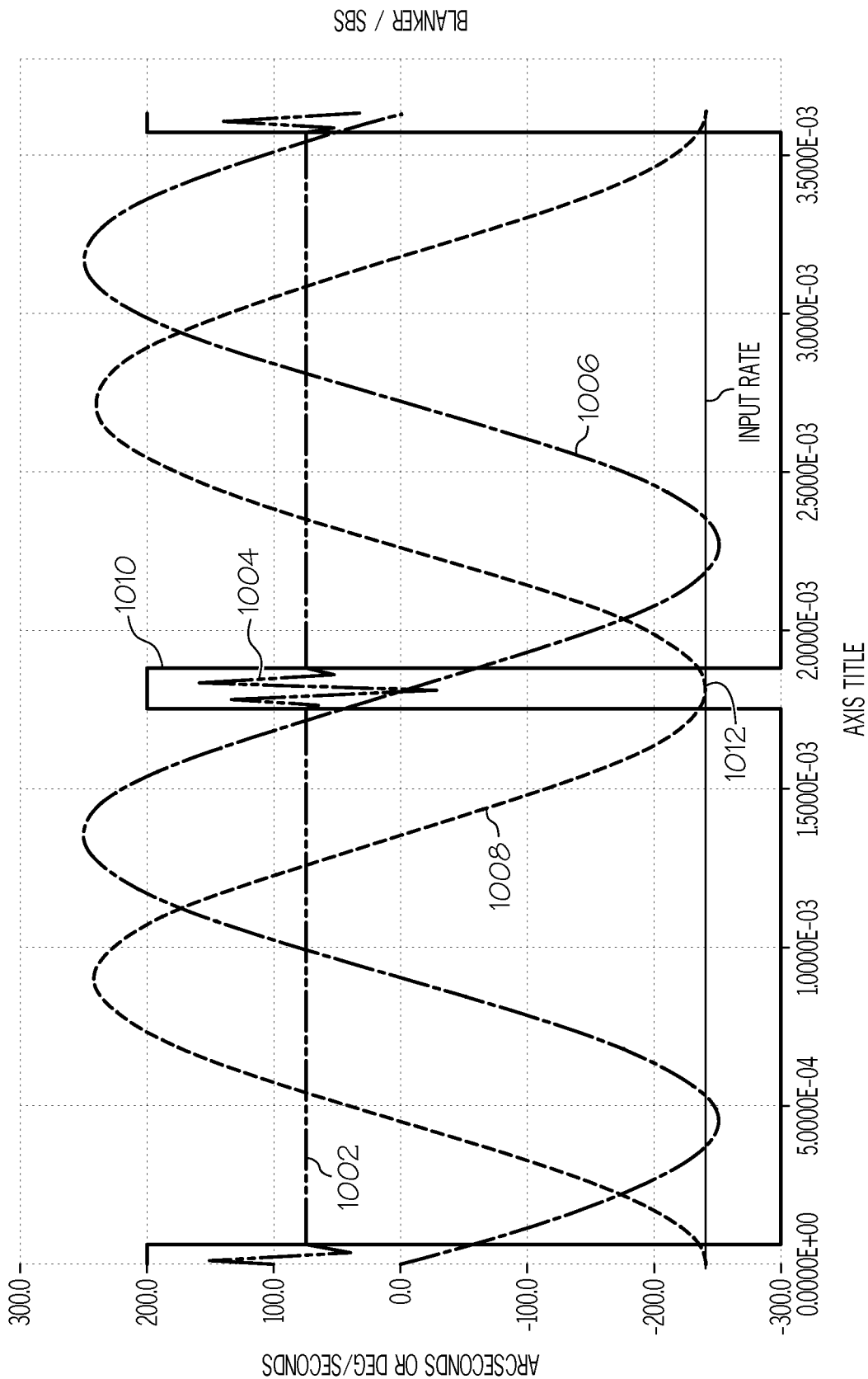

As shown in FIG. 10A, with an input rate of 0 degrees/second, a blanker pulse 1010 is actuated at a zero dither rate, which is at the peaks and valleys of the angular position signal 1006 where SBS components 1004 occur. At increased input rates, blanker pulse 1010 is actuated at points in time where the dither rate plus the inertial rate is zero. For example, as depicted in FIG. 10B, as the input rate is increased to 100 degrees/second, the SBS components 1004 draw toward a negative peak 1012 of angular rate signal 1008. As depicted in FIG. 10C, as the input rate is further increased to 200 degrees/second, the SBS components 1004 draw still closer to negative peak 1012. When the input rate is equal to negative peak 1012 (peak dither rate), in this case at 240 degrees/second, the SBS components 1004 merge as shown in FIG. 10D. At higher input rates, the SBS components disappear altogether.

Figure 10E:
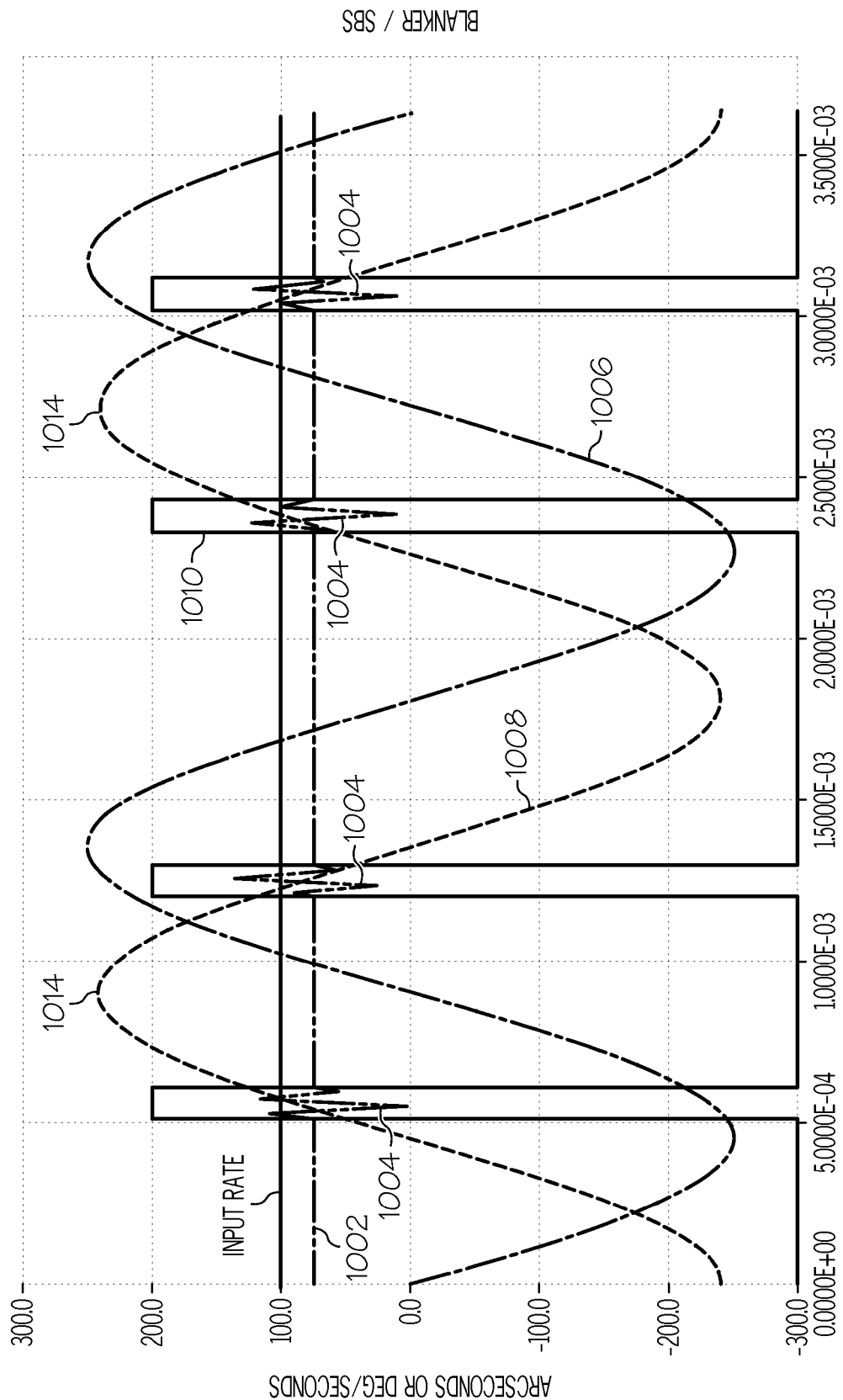
Figure 10F:
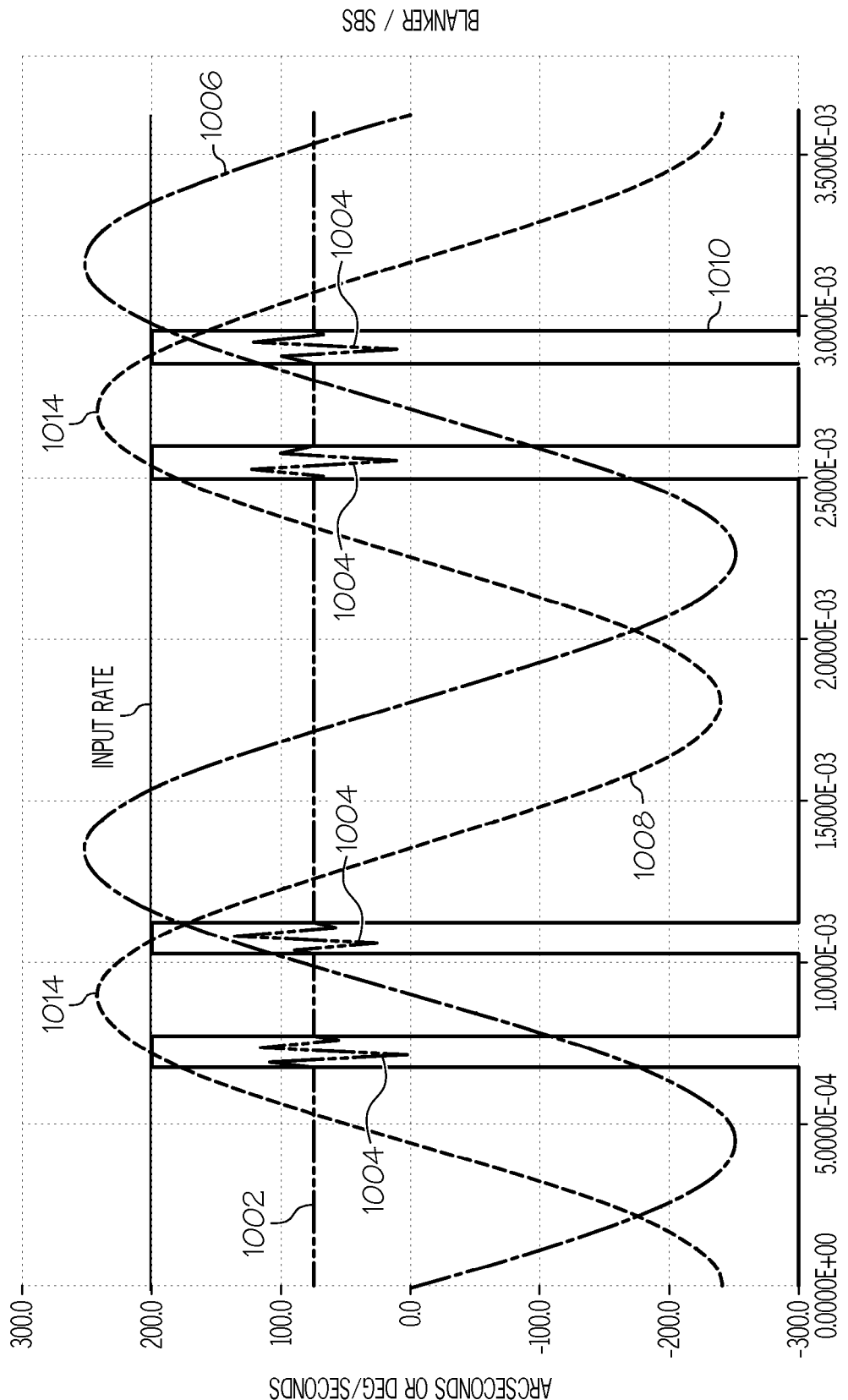
Figure 10G:
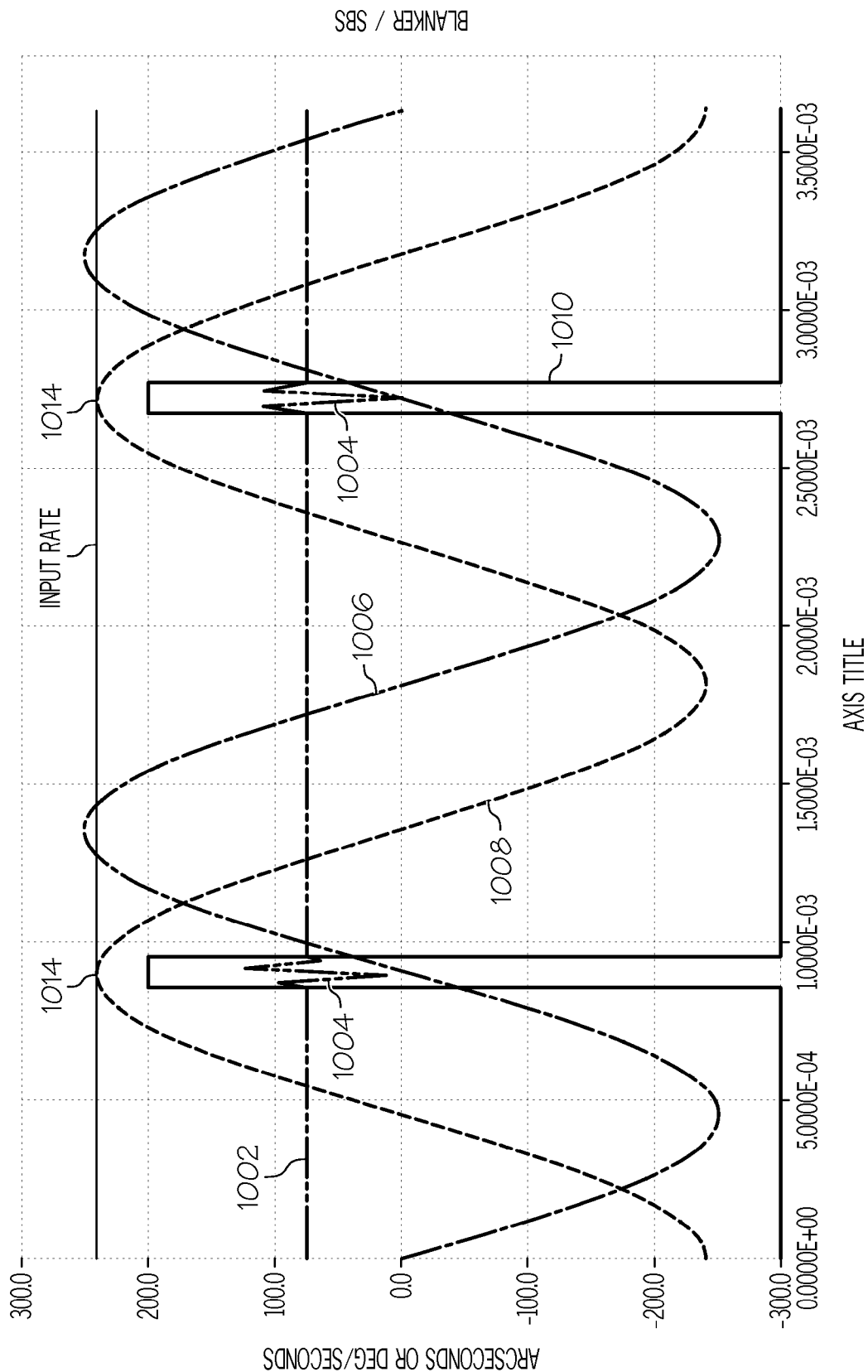

At decreased input rates, blanker pulse 1010 is also actuated at points in time where the dither rate plus the inertial rate is zero. For example, as depicted in FIG. 10E, as the input rate is decreased to −100 degrees/second, the SBS components 1004 draw toward a positive peak 1014 of angular rate signal 1008. As depicted in FIG. 10F, as the input rate is further decreased to −200 degrees/second, the SBS components 1004 draw still closer to positive peak 1014. When the input rate is equal to the positive peak 1014, in this case at −240 degrees/second, the SBS components 1004 merge as shown in FIG. 10G. For even lower input rates, the SBS components disappear altogether.

Figure 11B:
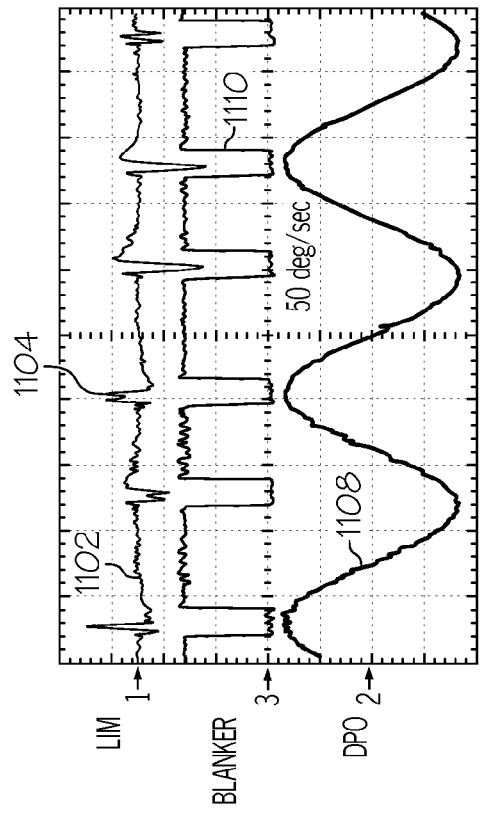
FIGS. 11A-11G are laboratory captures of various signals utilized during rate sensitive blanking at differing inertial rates.
Figure 11D:
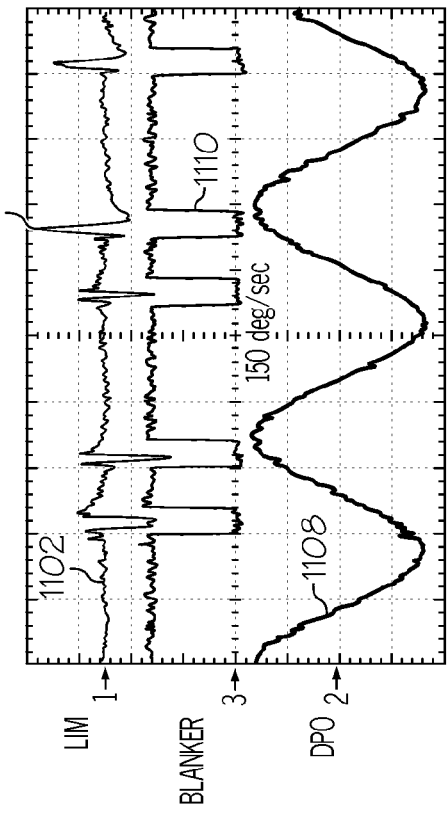
Figure 11A:
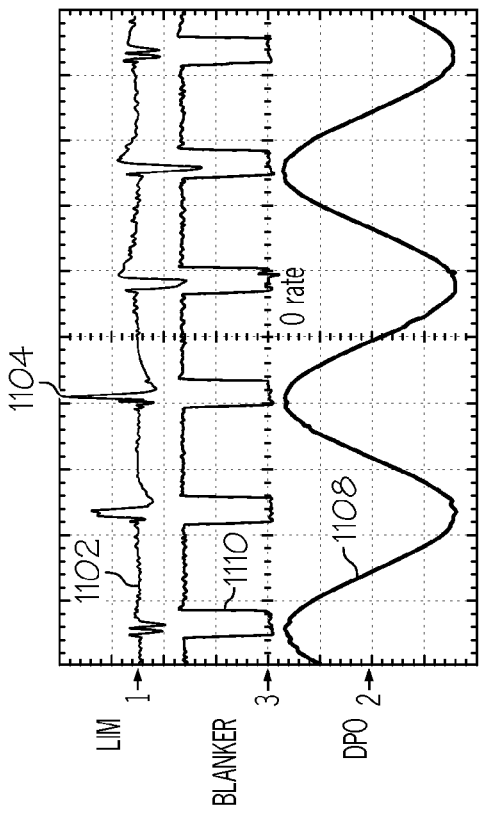
Figure 11C:
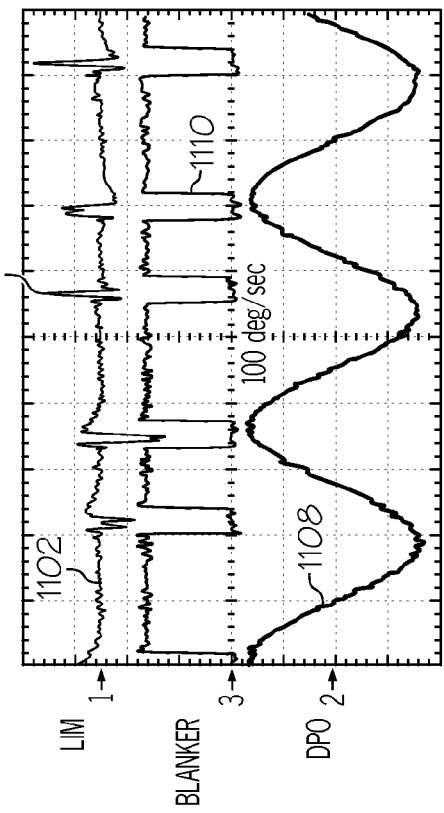
Figure 11E:
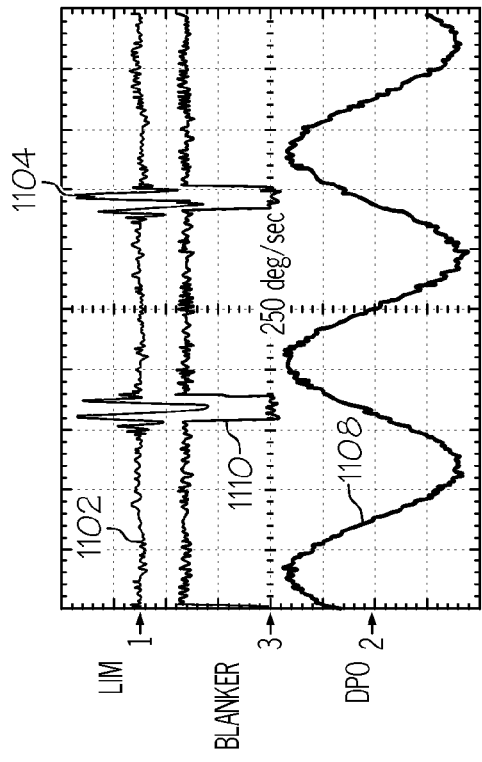

FIGS. 11A-11G are laboratory captures of various signals utilized in the present technique at differing inertial input rates. These signals include a LIM signal 1102 with SBS components 1104, a Dither Pickoff (DPO) signal 1108, which represents position, and a blanker pulse 1110. As shown in FIG. 11A, the input rate is 0; in FIG. 11B, the input rate is increased to 50 degrees/second; in FIG. 11C, the input rate is increased to 100 degrees/second; in FIG. 11D, the input rate is increased to 150 degrees/second; in FIG. 11E, the input rate is increased to 200 degrees/second; in FIG. 11F, the input rate is increased to 250 degrees/second.

Figure 11F:
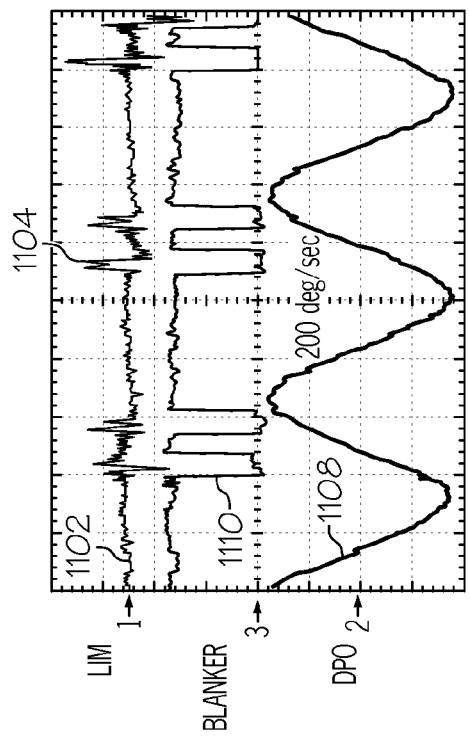
Figure 11G:
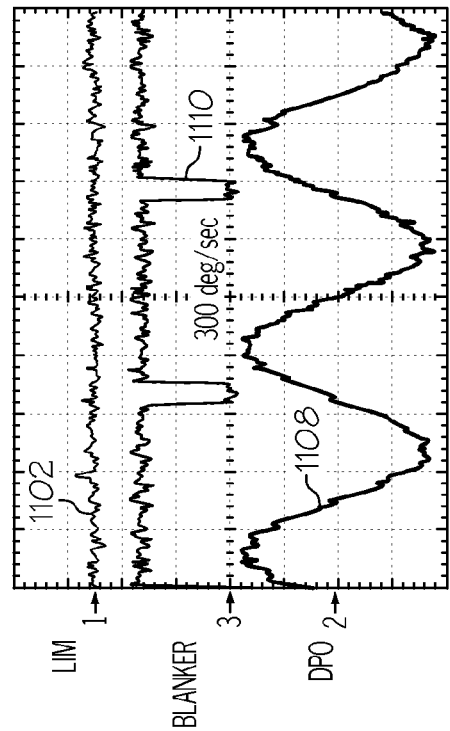

As shown in FIGS. 11A-11E, as the input rate increase, pairs of SBS components 1104 shift toward each other, and in FIG. 11F the SBS components merge at an input rate of 250 degrees/second. The blanker pulse 1110 is actuated at points in time where the dither rate plus the inertial rate is zero. In FIG. 11G, the SBS components disappear because the input rate has exceeded the peak dither rate.

A processor for use in the present system can be implemented using software, firmware, hardware, or any appropriate combination thereof, as known to one of skill in the art. By way of example and not limitation, hardware components for the processor can include one or more microprocessors, memory elements, digital signal processing (DSP) elements, interface cards, and other standard components known in the art. Any of the foregoing may be supplemented by, or incorporated in, specially-designed application-specific integrated circuits (ASICs) or field programmable gate arrays (FPGAs). The processor includes or functions with software programs, firmware, or other computer readable instructions for carrying out various process tasks, calculations, and control functions, used in the present method. These instructions are typically tangibly embodied on any appropriate computer program product that includes a computer readable medium used for storage of computer readable instructions or data structures.

The present method can be implemented with any available computer readable storage media that can be accessed by a general purpose or special purpose computer or processor, or any programmable logic device. Suitable computer readable media may include storage or memory media such as magnetic or optical media. For example, storage or memory media may include conventional hard disks, Compact Disk-Read Only Memory (CD-ROM), DVDs, volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), and the like), Read Only Memory (ROM), Electrically Erasable Programmable ROM (EEPROM), flash memory, Blu-ray discs, and the like. Combinations of the above are also included within the scope of computer readable media.

The present methods can be implemented by computer executable instructions, such as program modules. Generally, program modules include routines, programs, objects, data components, data structures, algorithms, and the like, which perform particular tasks or implement particular abstract data types.

Although specific embodiments have been illustrated and described herein, it will be appreciated by those of ordinary skill in the art that any arrangement, which is calculated to achieve the same purpose, may be substituted for the specific embodiments shown. The described embodiments are to be considered in all respects only as illustrative and not restrictive. The scope of the invention is therefore indicated by the following claims rather than by the foregoing description. All changes that come within the meaning and range of equivalency of the claims are to be embraced within their scope.

What is claimed is:

1. A method for rate sensitive blanking in a path length control circuit of a gyroscope, the method comprising:
   determining a dither rate and an inertial rate of the gyroscope;
   detecting a zero rate of the gyroscope where one or more single beam signals occur, wherein the zero rate occurs when the sum of the dither rate and the inertial rate is about zero;
   determining one or more blanker positions based on the zero rate; and
   generating a blanker pulse at the one or more blanker positions such that the path length control circuit suspends operation when the one or more single beam signals occur.

2. The method of claim 1, wherein the gyroscope is a ring laser gyroscope.

3. The method of claim 1, further comprising receiving a laser intensity monitor signal including the one or more single beam signals.

4. The method of claim 1, further comprising:
   receiving a dither pick-off signal representing an angle of dither displacement;
   calculating the dither rate from the dither pick-off signal;
   receiving an inertial sensor signal from the gyroscope; and calculating the inertial rate from the dither rate and the inertial sensor signal.

5. The method of claim 4, wherein the inertial rate is calculated using dither compensation to remove the dither rate.

6. The method of claim 4, wherein the blanker positions are synchronized to the dither pick-off signal with a pulse width modulator.

7. The method of claim 4, wherein the inertial rate is converted to an analog version of the inertial rate, and input into an analog comparator along with the dither rate.

8. The method of claim 7, wherein the blanker pulse is generated by a one-shot circuit coupled to an output of the analog comparator.

9. The method of claim 4, further comprising producing an internal reference voltage representing the calculated inertial rate.

10. The method of claim 9, wherein the dither rate is input into a digital comparator for comparison with the internal reference voltage.

11. The method of claim 10, wherein the blanker pulse is generated by a one-shot circuit coupled to an output of the digital comparator.

12. The method of claim 1, further comprising:
inputting a gyroscope readout signal into an integrator coupled to an analog comparator; and
inputting a reference voltage into the analog comparator.

13. The method of claim 12, wherein the blanker pulse is generated by a one-shot circuit coupled to an output of the analog comparator when the integrator ramps above a comparator threshold.

14. The method of claim 1, wherein the blanker pulse is generated with a one-shot circuit coupled to a timer.

15. A system for rate sensitive blanking in a path length control circuit of gyroscope, the system comprising:
at least one processor; and
a computer readable medium having instructions stored thereon executable by the processor to perform a method for rate sensitive blanking, the method comprising:
receiving a laser intensity monitor signal having one or more single beam signal components;
receiving a dither pick-off signal representing the angle of dither displacement;
calculating a dither rate from the dither pick-off signal;
receiving an inertial sensor signal from the gyroscope;
calculating an inertial rate from the dither rate and the inertial sensor signal;
determining one or more blanker positions where the one or more single beam signal components occur using the inertial rate; and
generating a blanker pulse at the blanker positions such that the path length control circuit suspends operation when the one or more single beam signal components occur.

16. The system of claim 15, wherein the gyroscope is a ring laser gyroscope.

17. The system of claim 15, wherein the processor is operatively coupled to a pulse width modulator.

18. The system of claim 15, wherein the processor is operatively coupled to an analog comparator and is configured to convert the inertial rate to an analog version of the inertial rate.

19. The system of claim 15, wherein the processor is operatively coupled to a digital comparator configured to compare an internal reference voltage to the dither rate.

* * * * *